United States Patent
Jeon

(10) Patent No.: US 9,531,019 B2
(45) Date of Patent: Dec. 27, 2016

(54) FUEL CELL SYSTEM AND METHOD FOR CONTROLLING THE SAME

(71) Applicant: Hyundai Motor Company, Seoul (KR)

(72) Inventor: Yei Sik Jeon, Seoul (KR)

(73) Assignee: Hyundai Motor Company, Seoul (KR)

(*) Notice: Subject to any disclaimer, the term of this patent is extended or adjusted under 35 U.S.C. 154(b) by 196 days.

(21) Appl. No.: 14/565,327

(22) Filed: Dec. 9, 2014

(65) Prior Publication Data

US 2016/0006056 A1  Jan. 7, 2016

(30) Foreign Application Priority Data

Jul. 7, 2014 (KR) .................. 10-2014-0084230

(51) Int. Cl.
*H01M 8/04* (2016.01)

(52) U.S. Cl.
CPC ....... *H01M 8/04223* (2013.01); *H01M 8/0432* (2013.01); *H01M 8/0444* (2013.01); *H01M 8/04225* (2016.02); *H01M 8/04302* (2016.02); *H01M 8/04303* (2016.02); *H01M 8/04328* (2013.01); *H01M 8/04955* (2013.01); *H01M 8/04992* (2013.01); *H01M 8/04228* (2016.02); *H01M 8/04358* (2013.01); *H01M 8/04447* (2013.01); *H01M 8/04798* (2013.01); *H01M 2250/20* (2013.01); *Y02E 60/50* (2013.01); *Y02T 90/32* (2013.01)

(58) Field of Classification Search
CPC .............. H01M 2250/20; H01M 8/04223; H01M 8/04225; H01M 8/04228; H01M 8/04302; H01M 8/04303; H01M 8/0432; H01M 8/04328; H01M 8/04358; H01M 8/0444; H01M 8/0447; H01M 8/04798; H01M 8/04955; H01M 8/04992
See application file for complete search history.

(56) References Cited

U.S. PATENT DOCUMENTS

2004/0121203 A1  6/2004  Varadaraj et al.
2009/0291342 A1  11/2009  Tezuka et al.

FOREIGN PATENT DOCUMENTS

| JP | 2004-020330 A | 1/2004 |
| JP | 2008-010196 A | 1/2008 |
| JP | 2011-239639 A | 11/2011 |
| WO | 01/22515 A1 | 3/2001 |
| WO | 2006/071223 A1 | 7/2006 |

*Primary Examiner* — Carlos Bercena
(74) *Attorney, Agent, or Firm* — Mintz Levin Cohn Ferris Glovsky and Popeo, P.C.; Peter F. Corless

(57) ABSTRACT

Disclosed is a fuel cell system and a method for controlling the fuel cell system. In the method, an external air temperature and a fuel cell temperature are monitored. When a vehicle having the fuel cell system mounted therein is keyed on, a shut-off duration of the fuel cell system, a maximum external air temperature for the shut-off duration and a maximum fuel cell temperature for the shut-off duration are calculated. A gas composition of a fuel cell at a key-on time is estimated using the shut-off duration, the maximum external air temperature and the maximum fuel cell temperature. An ignition condition of the fuel cell system is set based on the estimated gas composition. Ignition of the fuel cell system is performed based on the set ignition condition.

15 Claims, 4 Drawing Sheets

FUEL CELL SYSTEM AND METHOD FOR CONTROLLING THE SAME

CROSS-REFERENCE TO RELATED APPLICATION

This application claims under 35 U.S.C. §119(a) the benefit of Korean Patent Application No. 10-2014-0084230 filed Jul. 7, 2014, the entire contents of which are incorporated herein by reference.

TECHNICAL FIELD

The present invention relates to a fuel cell system and a method for controlling the fuel system. In particular, variable ignition conditions may be applied the fuel cell system and the method for controlling the fuel cell by reflecting a change in composition of gases in the fuel cell for a shut-off duration.

BACKGROUND

The public interest and necessity of green energy vehicles has increase recently. Among these green energy vehicles, a fuel cell vehicle obtains driving force from a fuel cell.

FIG. 1 illustrates an exemplary fuel cell system mounted in an exemplary fuel cell vehicle in the arts.

As shown in FIG. 1, the fuel cell system 10 includes a fuel cell 11, a hydrogen tank 12, a hydrogen supply unit 13 for supply hydrogen to the fuel cell 11, an air supply unit 14 for supplying external air to the fuel cell 11, a Purge valve 15 for exhausting gases such as nitrogen and steam to the exterior, and a fuel cell control unit 16 for controlling operations of the fuel cell system 10.

The fuel cell 11 includes a hydrogen electrode 11a and an air electrode 11b, and the two electrodes 11a and 11b are separated by an electrolyte membrane 11c. Hydrogen supplied to the hydrogen electrode 11a reacts with oxygen in air supplied to the air electrode 11b, thereby generating electric energy. The electric energy is used as driving energy of the vehicle.

When the fuel cell system 10 is in a shut-off state, the composition of gases in the fuel cell 11 is changed depending on a shut-off duration. The graph in FIG. 2 illustrates a change in composition of gases depending on a shut-off duration. As shown in FIG. 2, the horizontal axis refers to the shut-off duration of the fuel cell system, and the vertical axis refers to the concentration of gases based on the shut-off duration. The shut-off duration of the fuel cell system 10 is divided into an initial shut-off duration (0 to t1), a middle shut-off duration (t1 to t2), and a latter shut-off duration (after t2).

In the initial shut-off duration, hydrogen remaining in the fuel cell 11 disappears by reacting with oxygen remaining in system piping. Accordingly, the concentration of hydrogen in the fuel cell 11 is gradually decreased, but the concentration of nitrogen is gradually increased.

In the middle shut-off duration, hydrogen and oxygen do not exist in the fuel cell 11, but the concentration of nitrogen is saturated.

In the latter shut-off duration, external air is flowed in the fuel cell 11 through fine cracks existing in system components such as valves or piping, such that the concentration of oxygen in the fuel cell 11 gradually increases. Accordingly, the concentration of nitrogen gradually decreases.

Although the composition of gases in the fuel cell is changed depending on the shut-off duration as described above, in the related arts, ignition in the typical fuel cell system may be performed without considering a change in composition of gases in a fuel cell.

According to the related art ignition method, for example, when the ignition is performed in a state in which the concentration of hydrogen is low, the fuel cell may be deteriorated due to a local lack of hydrogen. On the contrary, when the ignition is performed in a state in which the concentration of hydrogen is excessively high, the fuel efficiency and safety of the vehicle may be lowered due to excessive exhaustion of hydrogen.

In addition, according to the related art ignition method, when the shut-off duration belonging to the latter shut-off duration, a carbon catalyst of the air electrode may be corroded due to the influence of oxygen flowed in the fuel cell before the ignition. As such, the durability of the fuel cell may be degraded.

SUMMARY OF THE INVENTION

The present invention provides a fuel cell system and a method for controlling the fuel cell system to provide technical solutions to above described technical difficulties which are caused by the ignition method of the related art fuel cell system. In particular, constant ignition conditions may be applied to the fuel cell system and the method without reflecting any composition of gases in the fuel cell.

In one aspect, the present invention provides a method for controlling a fuel cell system. The method may include steps of: (a) monitoring an external air temperature and a fuel cell temperature; (b) calculating a shut-off duration of the fuel cell system, a maximum external air temperature for the shut-off duration and a maximum fuel cell temperature for the shut-off duration when a vehicle having the fuel cell system mounted therein is keyed on; (c) estimating a gas composition of a fuel cell at a key-on time using the shut-off duration, the maximum external air temperature and the maximum fuel cell temperature; (d) setting an ignition condition of the fuel cell system based on the estimated gas composition; and (e) performing ignition of the fuel cell system based on the set ignition condition.

In addition, the step (c) may include steps of: (c1) calculating a disappearance time of hydrogen remaining in the fuel cell at a key-off time using the maximum fuel cell temperature; and (c2) estimating that the fuel cell has a first gas composition including nitrogen and remaining hydrogen at the key-on time when the shut-off duration is less than the disappearance time, and estimating that any hydrogen does not remain in the fuel cell at the key-on time when the shut-off duration is greater than the disappearance time.

In particular, in the step (c1), the disappearance time may be calculated from a table showing disappearance times with respect to fuel cell temperatures, which is previously stored in a memory of the fuel cell system.

In the step (c2), when the shut-off duration is less than the disappearance time, the concentration of hydrogen remaining in the fuel cell at the key-on time may be calculated from a difference between the disappearance time and the shut-off duration.

Moreover, the step (c) may further include steps of: (c3) calculating an external air reaching time taken until external air reaches the fuel cell under a condition of the maximum external air temperature when it is estimated that any hydrogen does not exist in the fuel cell at the key-on time; and (c4) estimating that the fuel cell has a second gas composition including only nitrogen when the shut-off duration is less than the external air reaching time, and estimating that the fuel cell has a third gas composition including nitrogen and oxygen flowed in the fuel cell when the shut-off duration is greater than the external air reaching time.

In particular, in the step (c3), the external air reaching time under the condition of the maximum external air temperature may be calculated from a table showing external air reaching times based on external air temperatures, which is previously stored in the memory of the fuel cell system. Alternatively, in the step (c3), the external air reaching time under the condition of the maximum external air temperature may be calculated using the following equation:

$$t_2 = k \times (T_M/T_R)^{1/2} \times t_R.$$

As used herein, $t_2$ refers to an external air reaching time under the condition of the maximum external air temperature, k refers to a correction constant based on design specifications of the fuel cell system, $T_M$ refers to a maximum external air temperature, $T_R$ refers to a predetermined reference temperature, and $t_R$ refers to an external air reaching temperature calculated at the reference temperature.

In the step (d), a Purge amount to be performed at an ignition time of the fuel cell system may be variably determined based on the estimated gas composition.

In still another further exemplary embodiment, in the step (d), a second Purge amount with respect to the second gas composition may be determined to be greater than a first Purge amount with respect to the first gas composition, and a third Purge amount with respect to the third gas composition may be determined to be greater than the second Purge amount.

As described above, according to various exemplary methods of the present invention, the ignition conditions may be determined by reflecting compositions of the gases in the fuel cell, thereby providing advantages. For example, the ignition of the fuel cell system may be performed by setting a Purge amount suitable for remaining hydrogen amount and the amount of hydrogen exhausted from the fuel cell through Purge performance in an ignition duration may be minimized. Accordingly, fuel efficiency of the vehicle may be improved and safety concerns due to excessive exhaustion of hydrogen may be reduced. Further, the amount of hydrogen in the fuel cell can be maintained substantially constant, fuel cell voltage may be maintained substantially stably and deterioration of the fuel cell due to a local lack of hydrogen may be prevented. In addition, it may be previously estimated whether oxygen flowed in the fuel cell does not exist at the key-on time. Accordingly, it may be previously determined whether a high-potential control process is performed before ignition is performed. Moreover, corrosion of the fuel cell due to high voltage caused by oxygen flowed in the fuel cell may be substantially prevented and durability of the fuel cell may be improved.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
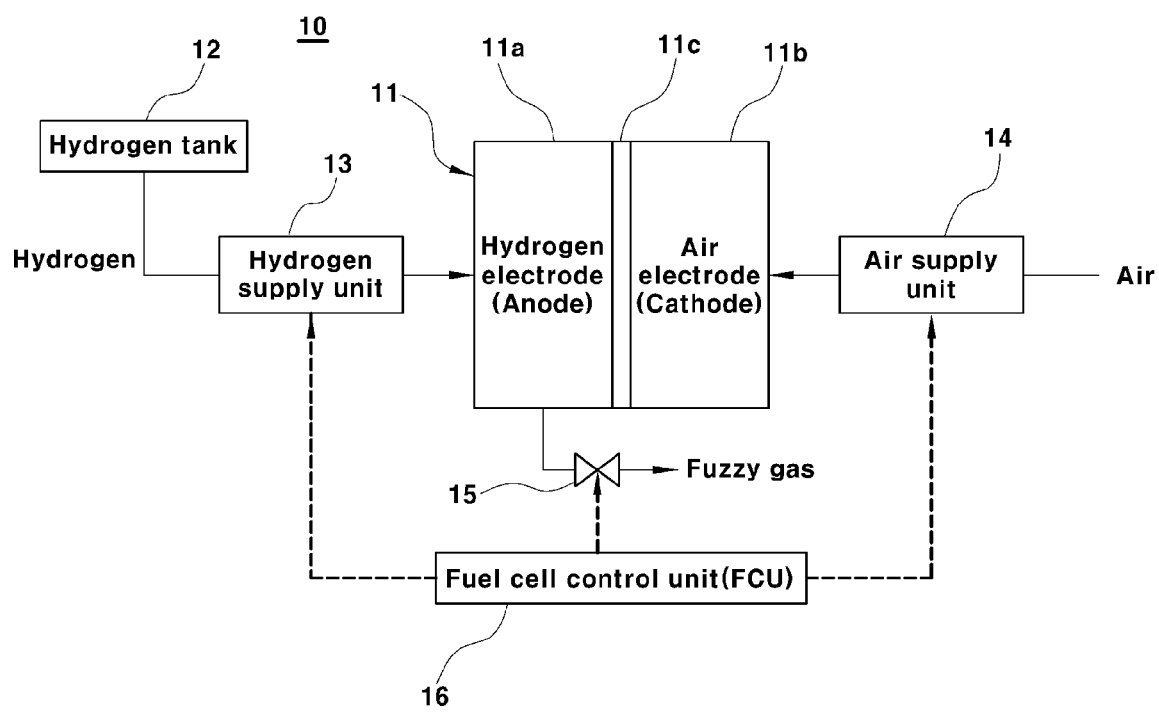
FIG. 1 illustrates an exemplary fuel cell system mounted in a fuel cell vehicle according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
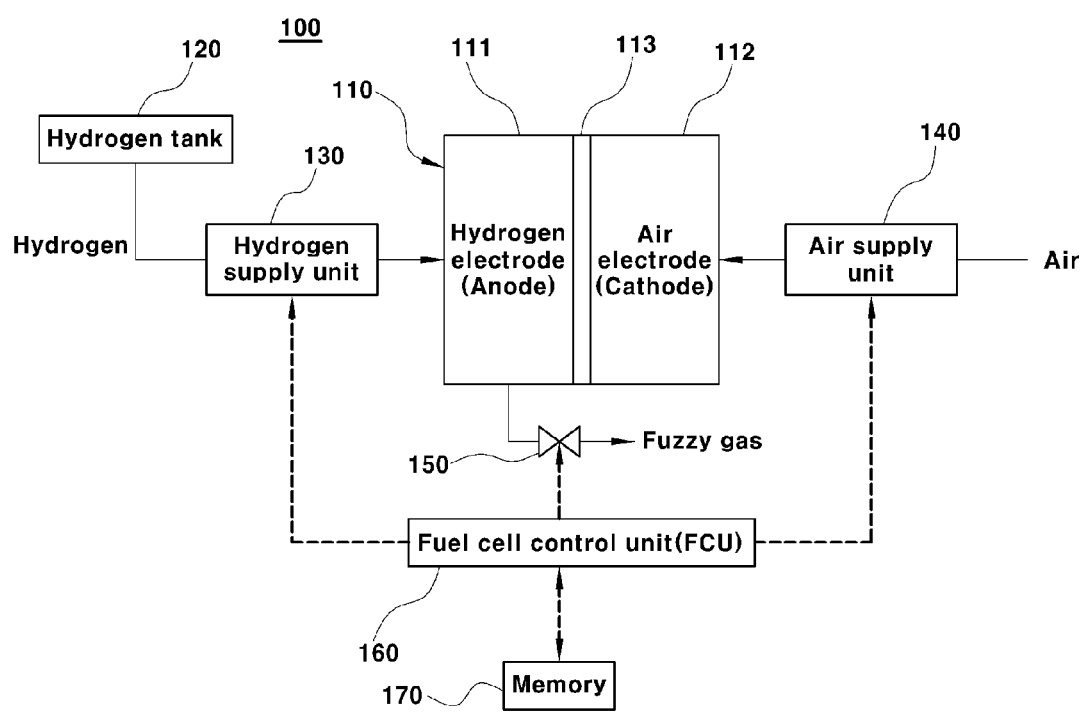
FIG. 3 illustrates an exemplary fuel cell system according to an exemplary embodiment of the present invention.

FIG. 3 illustrates an exemplary fuel cell system according to an exemplary embodiment of the present invention.

As shown in FIG. 3, the fuel cell system 100 according to an exemplary embodiment of the present invention may include: a fuel cell 110; a hydrogen tank 120; a hydrogen supply unit 130 for supplying hydrogen stored in the hydrogen tank to the fuel cell 110; an air supply unit 140 for supplying external air to the fuel cell 110; a Purge valve 150 for exhausting unnecessary gases such as nitrogen and steam from the fuel cell 110; a fuel cell control unit 160 for controlling operations of the fuel cell system 100; and a memory 170 for storing various kinds of information necessary for control of the fuel cell system 100.

The fuel cell 110 may include a plurality of fuel cells stacked in a stack form. Accordingly, the fuel cell 110 is frequently referred to as a 'fuel cell stack'. As shown in FIG. 3, each cell of the fuel cell 110 may include a hydrogen electrode 111 and an air electrode 112, which are separated from each other by an electrolyte membrane 113. Here, the hydrogen electrode is also referred to as an anode or fuel electrode, and the air electrode is also referred to as a cathode or oxygen electrode.

Hydrogen stored in the hydrogen tank 120 is supplied to the hydrogen electrode 111 of the fuel cell 110 by the hydrogen supply unit 130, and external air including oxygen is supplied to the air electrode 112 of the fuel cell 110 by the air supply unit 140. The hydrogen supplied to the hydrogen electrode 111 reacts with the oxygen in the air electrode 112, thereby generating electric energy. The electric energy may be used as driving energy of a vehicle.

The Purge valve 150 exhausts unnecessary gases such as steam and nitrogen included in the fuel cell 110 to the exterior of the fuel cell. A portion of the hydrogen supplied to the hydrogen electrode 111 may also be exhausted together with the unnecessary gases in the gas Purge process through the Purge valve 150, and thus, the adjustment of a gas Purge amount may be critical fuel efficiency and safety.

The fuel cell control unit 160 may control particular components of the fuel cell system 100, including the hydrogen supply unit 130, the air supply unit 140, the Purge valve 150 and the like, thereby controlling operations of the fuel cell system 100.

Particularly, the fuel cell control unit 160 may determine ignition conditions by reflecting a change in composition of gases in the fuel cell depending on a shut-off duration, to solve problems such as deterioration of fuel efficiency, lowering of safety and degradation of durability and the like, which may be caused in the related art fuel cell system where constant ignition conditions are applied without reflecting any composition of gases in the fuel cell.

Figure 4:
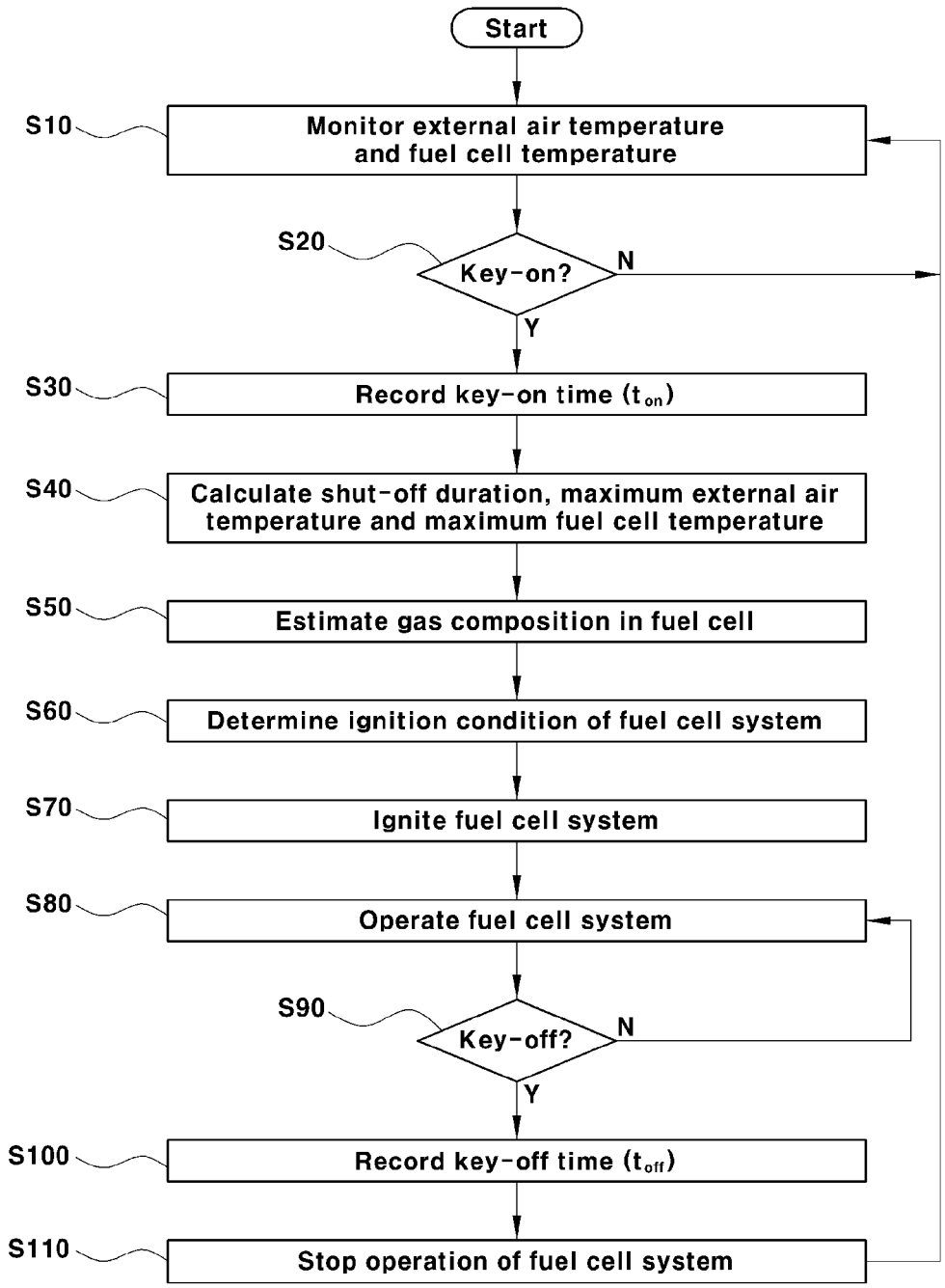
FIG. 4 illustrates an exemplary method for controlling the fuel cell system according to an exemplary embodiment of the present invention.

A method for controlling the fuel cell system, which is performed by the fuel cell control unit 160, will be described in detail in FIG. 4. FIG. 4 illustrates an exemplary embodiment of the method performed by the fuel cell control unit 160.

In a step S10, the fuel cell control unit 160 may monitor an external air temperature and a fuel cell temperature. In particular, the external air temperature may be measured by a temperature sensor. The fuel cell temperature may be measured by a separate temperature sensor attached to the fuel cell 110. Alternatively, the fuel cell temperature may be indirectly measured through temperature measurement of a circulation refrigerant such as a coolant for cooling the fuel cell.

In a step S20, the fuel cell control unit 160 may determine whether a vehicle having the fuel cell system 100 mounted therein is keyed on. When it is determined that the vehicle is not keyed on, the fuel cell control unit 160 may continue the step S10 described above. When it is determined that the vehicle is keyed on, the fuel cell control unit 160 may record a key-on time ($t_{on}$) in a step S30 and then may proceed to a step S40.

In the step S40, the fuel cell control unit 160 may calculate a shut-off duration of the fuel cell system 100, a maximum external air temperature for the shut-off duration, and a maximum fuel cell temperature for the shut-off duration. The maximum external air temperature and the maximum fuel cell temperature may be easily calculated from the monitoring values obtained in the step S10 described above.

Meanwhile, from steps S90 and S100 which will be described later, when the vehicle is keyed off, a key-off time ($t_{off}$) may be recorded in the memory 170. Accordingly, the fuel cell control unit 160 may calculate a shut-off duration ($t_p$) of the fuel cell system 100 using the key-off time ($t_{off}$) and the key-on time ($t_{on}$), stored in the memory 170. In particular, the shut-off time ($t_p$) may be calculated by the following Equation ①.

$$T_p = t_{on} - t_{off} \qquad \text{(Equation ①)}$$

In a step S50, the fuel cell control unit 160 may estimate the composition of gases in the fuel cell 110 using the shut-off duration, the maximum external air temperature and the maximum fuel cell temperature, calculated in the step S40.

Figure 2:
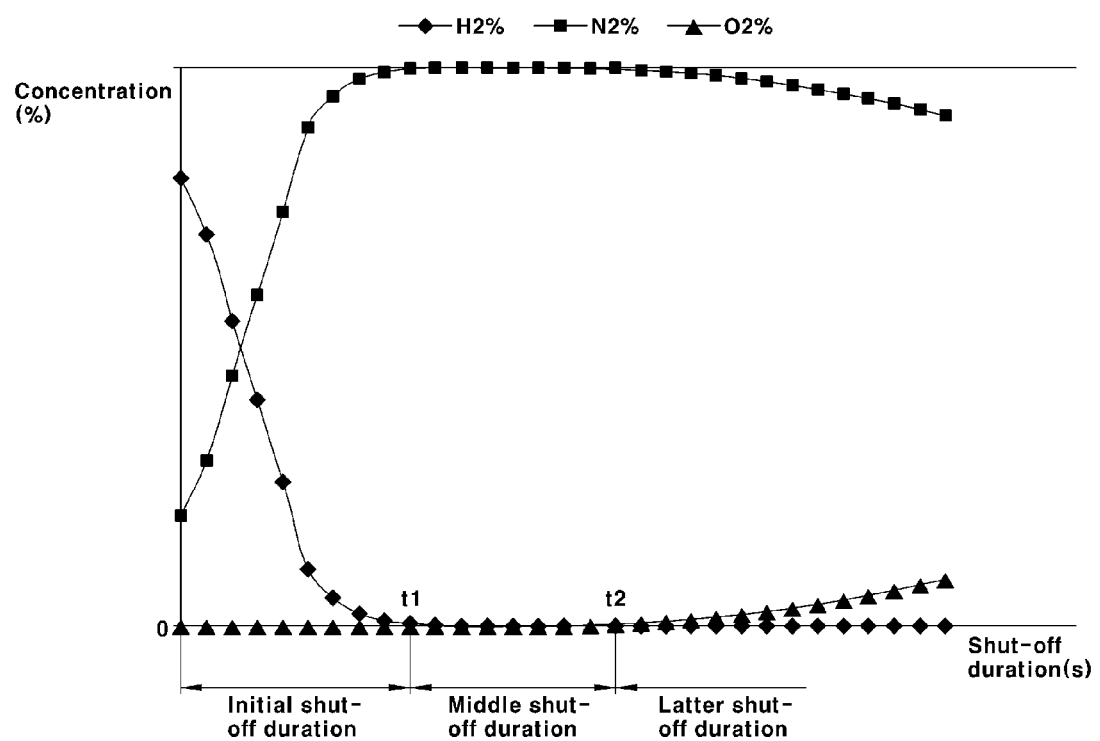
FIG. 2 is an exemplary graph illustrating an exemplary change in composition of gases in an exemplary fuel cell depending on a shut-off duration.

In FIG. 2, the shut-off duration ($t_p$) may be divided into an initial shut-off duration (0 to t1), a middle shut-off duration (t1 to t2), and a latter shut-off duration (after t2). The step S50 may be divided into a step which is referred to as 'S51' of determining whether the shut-off duration ($t_p$) belongs to the range of the initial shut-off duration (0 to t1), and a step which is referred to as 'S52' of determining whether the shut-off duration ($t_p$) belongs to the range of the latter shut-off duration (after t2).

In the step S51, the fuel cell control unit 160 may calculate a minimum time, i.e., a hydrogen disappearance time ($t_1$), which may be required for remaining hydrogen in the fuel cell 110 to disappear by reacting with oxygen flowed in the fuel cell 110.

Generally, the amount of remaining hydrogen at the key-off time ($t_{off}$) may be substantially constant, and the disappearance speed of the remaining hydrogen may be in proportion to the fuel cell temperature. Accordingly, the fuel cell temperature may be a only variable for determining the hydrogen disappearance time ($t_1$), and the hydrogen disappearance time ($t_1$) may be calculated using the fuel cell temperature based on the variable, particularly with the fuel cell temperature. In an exemplary embodiment, the hydrogen disappearance time ($t_1$) may be calculated using the maximum fuel cell temperature in the shut-off duration, in consideration that hydrogen disappears in the initial shut-off duration. A table showing the hydrogen disappearance time ($t_1$) with respect to the maximum fuel cell temperature may be previously stored in the memory 170.

After the hydrogen disappearance time ($t_1$) is calculated, the fuel cell control unit 160 may compare the hydrogen disappearance time ($t_1$) with the previously calculated shut-off duration ($t_p$).

When the shut-off duration ($t_p$) is less than the hydrogen disappearance time ($t_1$) from the comparison result, it may be estimated that the shut-off duration ($t_p$) belongs to the range of the initial shut-off duration (0 to t1) described above, and thus, it may be estimated the fuel cell 110 has a gas composition (first gas composition) including nitrogen and hydrogen (FIG. 2). In particular, the concentration of hydrogen remaining in the fuel cell 110 at the key-on time ($t_{on}$) may be calculated from a difference between the hydrogen disappearance time ($t_1$) and the shut-off duration ($t_p$). It may be readily understood that the amount of remaining hydrogen is in proportion to the difference between the hydrogen disappearance time ($t_1$) and the shut-off duration ($t_p$).

When the shut-off duration ($t_p$) is greater than the hydrogen disappearance time ($t_1$) from the comparison result, it may be estimated that the shut-off duration ($t_p$) is out of the range of the initial shut-off duration (0 to t1) described above and thus, it may be estimated that any remaining hydrogen does not exist in the fuel cell 110 (FIG. 2). In particular, the fuel cell control unit 160 may be proceed to a step S52 in order to determine whether the shut-off duration ($t_p$) belongs to the range of the latter shut-off duration (after t2).

In the step S52, the fuel cell control unit 160 may calculate an external air reaching time ($t_2$) taken until external air reaches the fuel cell 110 through diffusion under the condition of a maximum external air temperature ($T_M$). In particular, the external air reaching time ($t_2$) may be calculated under the condition of the maximum external air temperature ($T_M$) to increasing system stability against the worst case with respect to the oxygen flowed in the fuel cell 110.

From the relationship between a gas diffusion speed and a gas temperature, which is known in the art, the external air reaching time ($t_2$) may be in proportion to the square root of an extern air temperature. The Equation ② may be derived from the fact that the external air reaching time ($t_2$) at the maximum external air temperature may be calculated using the following Equation ②.

$$t_2 = k \times (T_M/T_R)^{1/2} \times t_R \qquad \text{(Equation ②)}$$

In Equation ②, $T_M$ refers to a maximum external air temperature, $t_2$ refers to an external air reaching time under the condition of the maximum external air temperature ($T_M$), k refers to a correction constant based on design specifications of the fuel cell system, $T_R$ refers to a predetermined reference temperature, and $t_R$ refers to an external air reaching temperature calculated at the reference temperature ($T_R$). In particular, $t_R$ may be previously calculated by performing a test at the reference temperature ($T_R$) such as at a temperature of about 25° C.

Alternatively, an external air reaching time ($t_2$) corresponding to the maximum external air temperature ($T_M$) may be obtained by using a table showing external air reaching times ($t_2$) with respect to external air temperatures, which is previously stored in the memory 170.

After the external air reaching time ($t_2$) is calculated, the fuel cell control unit 160 may compare the external air reaching time ($t_2$) with the shut-off duration ($t_p$) calculated in the step S40.

If the shut-off duration ($t_p$) is less than the external air reaching time ($t_2$), it may be estimated that the shut-off duration ($t_p$) belonging to the range of the middle shut-off duration (t1 to t2) described above. Accordingly, it may be estimated that the fuel cell 110 has a second gas composition including only saturated nitrogen without any oxygen flowed in the fuel cell 110 at the key-on time ($t_{on}$) (FIG. 2).

If the shut-off duration ($t_p$) is greater than the external air reaching time ($t_2$), it may be estimated that the shut-off duration ($t_p$) belonging to the range of the latter shut-off duration (after t2) described above. Accordingly, it may be estimated that the fuel cell 110 has a third gas composition including nitrogen and oxygen flowed in the fuel cell 110 at the key-on time ($t_{on}$) (see the graph of FIG. 2).

In a step S60, the fuel cell control unit 160 may determine an ignition condition of the fuel cell system 100 based on the gas composition estimated in the step S50.

When it is estimated that the fuel cell 110 has the first gas composition including hydrogen and nitrogen, the fuel cell control unit 160 may set a first Purge amount as the ignition condition. Particularly, the first Purge amount may be determined to have a value in inverse proportion to the amount of remaining hydrogen at the key-on time ($t_{on}$). As such, the first Purge amount may be determined such that the hydrogen concentration in the fuel cell at the ignition completion time may reach a target hydrogen concentration required in a normal operation.

When it is estimated that the fuel cell 110 has the second gas composition including only nitrogen, the fuel cell control unit 160 may set a second Purge amount as the ignition condition. Particularly, the second Purge amount may be determined such that the hydrogen concentration in the fuel cell at the ignition completion time may reach the target hydrogen concentration required in the normal operation. The second Purge amount may be set to be greater than the first Purge amount in consideration that any remaining hydrogen does not exist in the fuel cell.

When it is estimated that the fuel cell 110 has the third gas composition including nitrogen and oxygen, the fuel cell control unit 160 may set a third Purge amount as the ignition condition. In particular, the third Purge amount may be determined such that the hydrogen concentration in the fuel cell at the ignition completion time may reach the target hydrogen concentration required in the normal operation. However, the third Purge amount may be set to be slightly greater than the second Purge amount such that the oxygen flowed in the fuel cell 110 may be sufficiently removed. As described above, the oxygen flowed in the fuel cell 110 may cause corrosion of the carbon catalyst included in the air electrode 112 of the fuel cell 110.

Additionally, when it is estimated that the fuel cell 110 has the third gas composition including nitrogen and oxygen, the fuel cell control unit 160 may additionally determine that a high-potential exposure control process as well described in the art may be performed in an ignition duration in order to prevent corrosion of the air electrode 112.

In a step S70, the fuel cell control unit 160 may perform ignition of the fuel cell system 100 by applying the ignition condition determined in the step S60. In a step S80, the fuel cell control unit 160 may perform a normal operation on the fuel cell system 100 until the vehicle is keyed off.

Subsequently, if it is decided in a step S90 that the vehicle is keyed off, the fuel cell control unit 160 may record a key-off time ($t_{off}$) in the memory 170 in a step S100, and the fuel cell control unit 160 may stop the fuel cell system 100 in a step S110. Then, the fuel cell control unit 160 may return to step S10 described above to restart monitoring of the external air temperature and the fuel cell temperature.

As described above, in various exemplary embodiments of the method of the present invention may provide advantages by reflecting a gas composition in the fuel cell. For example, the ignition of the fuel cell system may be performed by setting a Purge amount suitable for remaining hydrogen amount and the amount of hydrogen exhausted from the fuel cell through Purge performance in an ignition duration may be minimized. Accordingly, fuel efficiency of the vehicle may be improves and safety concern due to substantial exhaustion of hydrogen may be reduced. Further, the amount of hydrogen in the fuel cell may be maintained substantially constant, and thus fuel cell voltage may be maintained stably and deterioration of the fuel cell due to a local lack of hydrogen may be reduced.

In addition, it may be previously estimated whether oxygen flowed in the fuel cell does not exist at the key-on time. Thus, it may be previously determined whether a high-potential control process may be performed before ignition is performed. Accordingly, corrosion of the fuel cell due to high voltage caused by oxygen flowed in the fuel cell may be substantially prevented and durability of the fuel cell may be improved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a fuel cell system, comprising:
    monitoring, by a controller, an external air temperature and a fuel cell temperature;
    calculating, by the controller, a shut-off duration of the fuel cell system, a maximum external air temperature for the shut-off duration and a maximum fuel cell temperature for the shut-off duration when a vehicle having the fuel cell system mounted therein is keyed on;
    estimating, by the controller, a gas composition of a fuel cell at a key-on time using the shut-off duration, the maximum external air temperature and the maximum fuel cell temperature;
    setting, by the controller, an ignition condition of the fuel cell system based on the estimated gas composition; and
    performing, by the controller, ignition of the fuel cell system based on the set ignition condition.

2. The method of claim 1, wherein the estimation includes:
    calculating, by the controller, a disappearance time of hydrogen remaining in the fuel cell at a key-off time using the maximum fuel cell temperature; and
    estimating, by the controller, that the fuel cell has a first gas composition including nitrogen and remaining hydrogen at the key-on time when the shut-off duration is less than the disappearance time, and estimating that any hydrogen does not remain in the fuel cell at the key-on time when the shut-off duration is greater than the disappearance time.

3. The method of claim 2, wherein the disappearance time is calculated from a table showing disappearance times with respect to fuel cell temperatures wherein the table is previously stored in a memory of the fuel cell system.

4. The method of claim 2, wherein when the shut-off duration is less than the disappearance time, the concentration of hydrogen remaining in the fuel cell at the key-on time is calculated from a difference between the disappearance time and the shut-off duration.

5. The method of claim 4, wherein the estimation further includes:
    calculating, by the controller, an external air reaching time taken until external air reaches the fuel cell under a condition of the maximum external air temperature when it is estimated that any hydrogen does not exist in the fuel cell at the key-on time; and
    estimating, by the controller, that the fuel cell has a second gas composition including only nitrogen when the shut-off duration is less than the external air reaching time, and estimating that the fuel cell has a third gas composition including nitrogen and oxygen flowed in the fuel cell when the shut-off duration is greater than the external air reaching time.

6. The method of claim 5, wherein the external air reaching time under the condition of the maximum external air temperature is calculated from a table showing external air reaching times based on external air temperatures, wherein the table is previously stored in the memory of the fuel cell system.

7. The method of claim 5, wherein the external air reaching time under the condition of the maximum external air temperature is calculated using the following equation:

$$t2 = k \times (TM/TR)^{1/2} \times tR, \text{ and}$$

wherein t2 is an external air reaching time under the condition of the maximum external air temperature, k is a correction constant based on design specifications of the fuel cell system, TM is a maximum external air temperature, TR is a predetermined reference temperature, and tR is an external air reaching temperature calculated at the reference temperature.

8. The method of claim 5, wherein, in the setting of the ignition condition, a Purge amount to be performed at an ignition time of the fuel cell system is variably set based on the estimated gas composition.

9. The method of claim 8, wherein, in the setting of the ignition condition, a second Purge amount with respect to the second gas composition is set to be greater than a first Purge amount with respect to the first gas composition, and a third Purge amount with respect to the third gas composition is set to be greater than the second Purge amount.

10. A non-transitory computer readable medium containing program instructions executed by a controller, the computer readable medium comprising:
    program instructions that monitor an external air temperature and a fuel cell temperature;
    program instructions that calculate a shut-off duration of the fuel cell system, a maximum external air temperature for the shut-off duration and a maximum fuel cell temperature for the shut-off duration when a vehicle having the fuel cell system mounted therein is keyed on;
    program instructions that estimate a gas composition of a fuel cell at a key-on time using the shut-off duration, the maximum external air temperature and the maximum fuel cell temperature;
    program instructions that set an ignition condition of the fuel cell system based on the estimated gas composition; and program instructions that perform ignition of the fuel cell system based on the set ignition condition.

11. The non-transitory computer readable medium of claim 10, further comprising:
program instructions that calculate a disappearance time of hydrogen remaining in the fuel cell at a key-off time using the maximum fuel cell temperature; and
program instructions that estimate that the fuel cell has a first gas composition including nitrogen and remaining hydrogen at the key-on time when the shut-off duration is less than the disappearance time, and estimate that any hydrogen does not remain in the fuel cell at the key-on time when the shut-off duration is greater than the disappearance time.

12. The non-transitory computer readable medium of claim 11, wherein the disappearance time is calculated from a table showing disappearance times with respect to fuel cell temperatures wherein the table is previously stored in a memory of the fuel cell system.

13. The non-transitory computer readable medium of claim 11, wherein when the shut-off duration is less than the disappearance time, the concentration of hydrogen remaining in the fuel cell at the key-on time is calculated from a difference between the disappearance time and the shut-off duration.

14. The non-transitory computer readable medium of claim 13, further comprising:
program instructions that calculate an external air reaching time taken until external air reaches the fuel cell under a condition of the maximum external air temperature when it is estimated that any hydrogen does not exist in the fuel cell at the key-on time; and
program instructions that estimate that the fuel cell has a second gas composition including only nitrogen when the shut-off duration is less than the external air reaching time, and estimate that the fuel cell has a third gas composition including nitrogen and oxygen flowed in the fuel cell when the shut-off duration is greater than the external air reaching time.

15. The non-transitory computer readable medium of claim 14, wherein the external air reaching time under the condition of the maximum external air temperature is calculated from a table showing external air reaching times based on external air temperatures, wherein the table is previously stored in the memory of the fuel cell system.

* * * * *